United States Patent
Munekata

(10) Patent No.: US 9,303,587 B2
(45) Date of Patent: Apr. 5, 2016

(54) RUBBER RING FOR GASKET

(71) Applicant: Yutaka Munekata, Tokyo (JP)

(72) Inventor: Yutaka Munekata, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 492 days.

(21) Appl. No.: 13/827,227

(22) Filed: Mar. 14, 2013

(65) Prior Publication Data
US 2013/0241156 A1    Sep. 19, 2013

(30) Foreign Application Priority Data
Mar. 14, 2012   (JP) .................................. 2012-057195

(51) Int. Cl.
*F02F 11/00*   (2006.01)
*F16J 15/08*   (2006.01)
*F16J 15/12*   (2006.01)

(52) U.S. Cl.
CPC ........... *F02F 11/002* (2013.01); *F16J 15/0818* (2013.01); *F16J 15/0825* (2013.01); *F16J 15/123* (2013.01); *F16J 2015/085* (2013.01); *F16J 2015/0856* (2013.01); *F16J 2015/0862* (2013.01)

(58) Field of Classification Search
CPC .. F02F 11/002; F16J 15/0818; F16J 15/0825; F16J 15/123; F16J 2015/0862; F16J 2015/085; F16J 2015/0856
USPC .................................................. 277/591–598
See application file for complete search history.

(56) References Cited

U.S. PATENT DOCUMENTS

| | | | |
|---|---|---|---|
| 4,620,710 A * | 11/1986 | Lambert et al. ................ | 277/596 |
| 4,635,949 A * | 1/1987 | Lucas et al. .................... | 277/595 |
| 5,700,017 A * | 12/1997 | Tensor ............................ | 277/596 |
| 5,906,463 A * | 5/1999 | Damm et al. ................... | 411/369 |
| 6,173,969 B1 * | 1/2001 | Stoll et al. ...................... | 277/630 |
| 6,626,439 B1 * | 9/2003 | Forry et al. .................... | 277/592 |
| 6,719,300 B2 * | 4/2004 | Fujino et al. ................... | 277/591 |

* cited by examiner

*Primary Examiner* — Vishal Patel
*Assistant Examiner* — Stacy Warren
(74) *Attorney, Agent, or Firm* — Manabu Kanesaka

(57) ABSTRACT

A rubber ring for a gasket has a first bulging portion composing a seal portion; a second bulging portion composing an attachment portion; and a depressed portion between the first bulging portion and the second bulging portion. The first bulging portion includes a thickest portion carrying out a sealing function, and when the rubber ring is compressed from both sides, the second bulging portion and the depressed portion have a thickness which does not contact with the faces sandwiching the gasket. An end of the metal plate is positioned in a range of the depressed portion between the first bulging portion and the second bulging portion, and between changing points wherein each of slope face, sloping toward the depressed portion from the two bulging portions, changes into a curved surface concaving on an outer side from a curved surface projecting on the outer side.

4 Claims, 4 Drawing Sheets

US 9,303,587 B2

RUBBER RING FOR GASKET

BACKGROUND OF THE INVENTION AND RELATED ART STATEMENT

The present invention relates to a rubber ring for a gasket used for ensuring a sealing property in a local portion of a gasket such as a fluid hole and the like of the gasket, and wherein an annular sealing rubber has been connected to a hole edge portion of a metal plate.

In order to improve the sealing property between a cylinder block and a cylinder head, an internal combustion gasket such as an automobile engine and the like is installed between the cylinder block and the cylinder head. In the gasket, there is provided the fluid. hole such as a water hole for passing coolant water, an oil hole for passing oil, and the like in addition to a combustion chamber hole opening in a combustion chamber of the cylinder block, and a bolt hole for inserting and passing a bolt which fastens securely the cylinder block and the cylinder head.

The rubber ring for a gasket is used for mainly ensuring the sealing property of the fluid hole and the like of such a gasket. In the rubber ring for a gasket, the hole edge portion of the metal plate is embedded in an end face on an outer circumferential side of the annular sealing rubber, and the aforementioned sealing rubber is attached to the hole edge portion. When the rubber ring is provided in the fluid hole and the like of the aforementioned gasket, the metal plate of the rubber ring is placed between gasket plates on both upper and lower face sides of the gasket, and the rubber ring is installed in a circumference of the liquid hole and the like. Then, when the gasket to which the rubber ring is provided, is installed between the cylinder head and the cylinder block, in the circumference of the fluid hole, the sealing rubber of the rubber ring is pressed by the cylinder head and the cylinder block, so that the sealing property of the fluid hole is ensured.

FIG. 6 shows a cross-sectional shape of substantial parts of a rubber ring for a gasket which has been conventionally used, as an example. A rubber ring 50 shown an FIG. 6 includes an annular sealing rubber 51, and a metal plate 52 including a hole having a shape which fits into the fluid hole and the like. A planar shape of the sealing rubber 51 corresponds to the shape of the hole of the metal plate 52. The hole edge portion of the metal plate 52 is embedded from the end face on the outer circumferential side of the sealing rubber 51, and the sealing rubber 51 is attached to the hole edge portion of the metal plate 52. The cross-sectional shape of the rubber ring 50 has a shape symmetrical to a center line L in a thickness direction thereof. Also, the sealing rubber 51 of the rubber ring 50 comprises a seal portion 54 including a thickest portion which has a largest thickness, and an attachment portion 55 relative to the metal plate 52, which is sloped such that a thickness diminishes as the thickness goes to the outer circumferential side.

FIGS. 7(a) to 7(c) show results of stress distributions when the rubber ring 50 for a gasket is sandwiched by two faces pressing from up and down, and is compressed only by 20%, 25%, and 30% in the thickness direction. A dimension of stress inside the rubber ring 50 is expressed using a contrasting density of dots, wherein as the density is paler, in an order of symbols A, B, C, and D, the stress becomes larger.

In a case wherein the rubber ring 50 is compressed only by 20% to 30%, a nearly whole surface of the sealing rubber 51 contacts with he upper and lower two faces pressing the rubber ring 50. The stress inside the sealing rubber 51 becomes large near a portion wherein the sealing rubber 51 has contact with the upper and lower two faces, and especially, in a case of FIGS. 7(b) and 7(c) wherein. the rubber ring 50 is compressed by 25% or above, the stress becomes entirely large even near an attachment interfacial surface between the metal plate 52 and the sealing rubber 51.

Referring to such stress distributions, in the aforementioned conventional rubber ring 50 for a gasket, when the rubber ring 50 for a gasket is used in a state in which a pressure is applied by placing the rubber ring 50 in the gasket, due to a deformation of the sealing rubber 51, the stress in the attachment interfacial surface between the sealing rubber 51 and the metal plate 52 becomes large. Consequently, in a case wherein the aforementioned gasket is used for a long period of time, a detachment of the sealing rubber 51 from the aforementioned metal plate 52 may occur, or a crack in the sealing rubber 51 may occur in a vicinity of an end portion of the metal plate 52, so that the above-mentioned detachment or the crack may develop so as to be easily damaged.

Also, FIG. 8 shows a cross-sectional shape of substantial parts of another rubber ring 60 for a gasket shown as a. reference example. As in a case of the rubber ring 50 shown in FIG. 6, the rubber ring 60 includes an annular sealing rubber 61, and a metal plate 62 including a hole having a shape which fits into the fluid. hole and the like of the gasket. The sealing rubber 61 comprises a seal portion 64 including a thickest portion which has a largest thickness, and an attachment portion 65 relative to the metal plate 62, whose outer face is sloped such that a thickness diminishes as the outer face of the attachment portion 65 goes to an outer circumferential side more than the example of FIG. 6

FIG. 9 shows a stress distribution when the rubber ring 60 of the aforementioned reference example is sandwiched. by two faces pressing from up and down, and is compressed by 30% in a thickness direction as in the case of FIG. 7(c). A dimension of stress inside the rubber ring 60 is expressed. using the same indication as FIGS. 7(a), 7(b), and 7(c).

Compared to the case of FIG. 7(c), as for the stress distribution shown in FIG. 9, in the rubber ring 60 of the reference example, a thickness of the attachment portion 65 relative to the metal plate 62 is sloped to diminish as the attachment portion 65 goes to the outer circumferential side more than the example of FIG. 6, so that a most part of the attachment portion 65 does not contact with the upper and lower two faces pressing the rubber ring 60. Inferably, from that reason, when the rubber ring 60 is compressed by 30%, the stress inside the sealing rubber 61 does not increase in a portion wherein the sealing rubber 61 does not contact with the upper and lower two faces. However, in a vicinity of an end portion of a hole edge portion of the metal plate 62 embedded in the sealing rubber 61, the stress becomes relatively large. This is considered to occur because an effect of a compression force acted on the seal portion 64 of the sealing rubber 61 affects the attachment portion 65 which is integrated although the thickness gradually diminishes from the seal portion 64.

Based on knowledge regarding the stress which acts on an inside of the sealing rubber in the aforementioned rubber ring, a technical object of the present invention is to provide a rubber ring for a gasket, which reduces the stress occurring near the attachment interfacial surface of the sealing rubber and the metal plate when the rubber ring for a gasket is compressed so as to be capable of controlling an occurrence of the detachment of the sealing rubber from the metal plate, or the crack in the sealing rubber in the vicinity of the end portion of the metal plate due to long periods of usage.

Further objects and advantages of the invention will be apparent from the following description of the invention.

SUMMARY OF THE INVENTION

In order to obtain the above-mentioned object, in a rubber ring for a gasket according to the present invention, a hole edge portion of a metal plate is embedded in an end face on an outer circumferential side of an annular sealing rubber, and the sealing rubber is attached to the hole edge portion of the metal plate. In the rubber ring, a cross-sectional shape thereof is symmetric with a center line in a thickness direction of the rubber ring. Also, the sealing rubber includes a first bulging portion composing a seal portion on an inner circumferential side of the sealing rubber; a second bulging portion composing an attachment portion relative to the metal plate on an outer circumferential side of the sealing rubber; and a depressed portion between the first bulging portion and the second bulging portion. The first bulging portion includes a thickest portion carrying out a sealing function. When the rubber ring is placed in the gasket, and is compressed by faces sandwiching the gasket from both face sides thereof, the second bulging portion and the depressed portion have a thickness which does not contact with the faces sandwiching the gasket. An end of the metal plate embedded in the sealing rubber is in a range of the depressed portion between the first bulging portion and the second bulging portion. Also, each of slope faces, sloping toward the depressed portion from both the bulging portions, is positioned between changing points which change into a curved surface of a depression outward from a curved surface of a projection outward.

In a preferred embodiment of the rubber ring for a gasket according to the present invention, the first bulging portion and the second bulging portion in the rubber ring are formed as including one portion of a straight line between a pair of sloped straight lines on both sides of the center line in the thickness direction of the rubber ring. The depressed portion is formed as including a shape depressing respectively both the straight lines by a circular arc vertically toward a center line side between both the bulging portions. Also, the end of the metal plate embedded in the sealing rubber is positioned within a range wherein the depressed portion forming the aforementioned circular arc is formed. Also, a least thickness of the sealing rubber in the depressed portion is composed to be 50% larger than a thickness of the thickest portion in the first bulging portion, and is composed to be smaller than a thickness of a top portion of the second bulging portion.

Moreover, in the preferred embodiment of the rubber ring for a gasket according to the present invention, as for a material of the sealing rubber, there can be used natural rubber, fluorine-containing rubber, nitrile-butadiene rubber, styrene-butadiene rubber, chloroprene rubber, or silicon rubber. Also, as for an adhesive agent attaching the sealing rubber and the metal plate, there can be used a polyurethane, acrylic, epoxy, phenol, nitrile-butadiene rubber, or chloroprene rubber adhesive. Moreover, for the metal plate, there can be used a plate of stainless steel, iron, or galvanized steel.

In the rubber ring for a gasket having the aforementioned structure, the depressed portion is formed between the first bulging portion composing the seal portion of the sealing rubber, and the second bulging portion composing the attachment portion relative to the metal plate. Also, when the rubber ring is compressed from both face sides by two faces sandwiching the gasket, the second bulging portion and the depressed portion have the thickness which does not have contact with the faces sandwiching the gasket. Accordingly, when the first bulging portion of the rubber ring is compressed from both face sides, the second bulging portion is not compressed. Therefore, as can be inferred from a stress distribution of FIG. 9, it can be determined that this not only allows the stress occurring near the attachment interfacial surface between the sealing rubber inside the second bulging portion and the metal plate to decrease, but also allows an effect of a compression force acting on the first bulging portion to be controlled from affecting a second bulging portion side by a presence of the depressed portion.

Also, the end of the metal plate embedded in the sealing rubber is in the range of the depressed portion between the first bulging portion and the second bulging portion. Also, the slope face, sloping toward the depressed portion from both the bulging portions, is positioned between the changing points which change into the curved surface of the depression outward from the curved surface of the projection outward. Accordingly, a large stress also does not act on a periphery of an end portion of the metal plate embedded in the sealing rubber so as to be capable of controlling an occurrence of a detachment of the sealing rubber from the metal plate, or a crack in the sealing rubber in a vicinity of the end portion of the metal plate due to long periods of usage.

Also, the aforementioned function of the present invention is confirmed by a result of a stress distribution in the later-mentioned example of the present invention as well.

With respect to the rubber ring for a gasket according to the present invention, when the rubber ring is compressed, the stress, occurring near the attachment interfacial surface of the sealing rubber and the metal plate, can be reduced so as to be capable of controlling the occurrence of the detachment of the sealing rubber from the metal plate, or the crack in the sealing rubber in the vicinity of the end portion of the metal plate due to the long periods of usage.

DETAILED DESCRIPTION OF PREFERRED EMBODIMENTS

Figure 1:
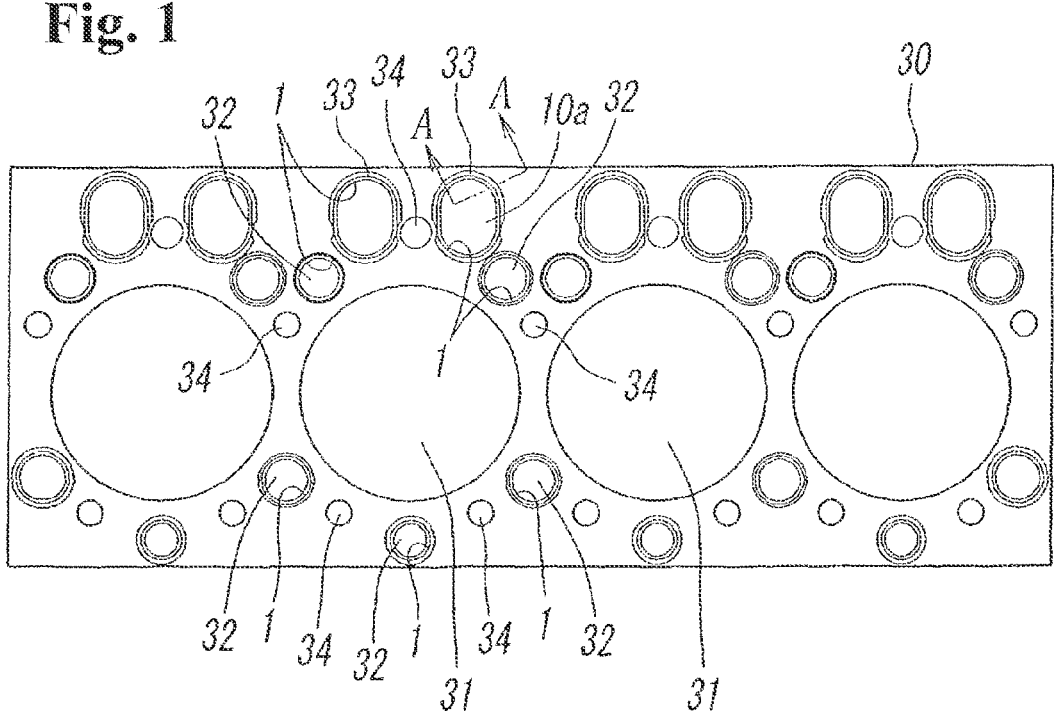
FIG. 1 is a plan view of a gasket comprising a rubber ring for a gasket according to the present invention.
Figure 2:
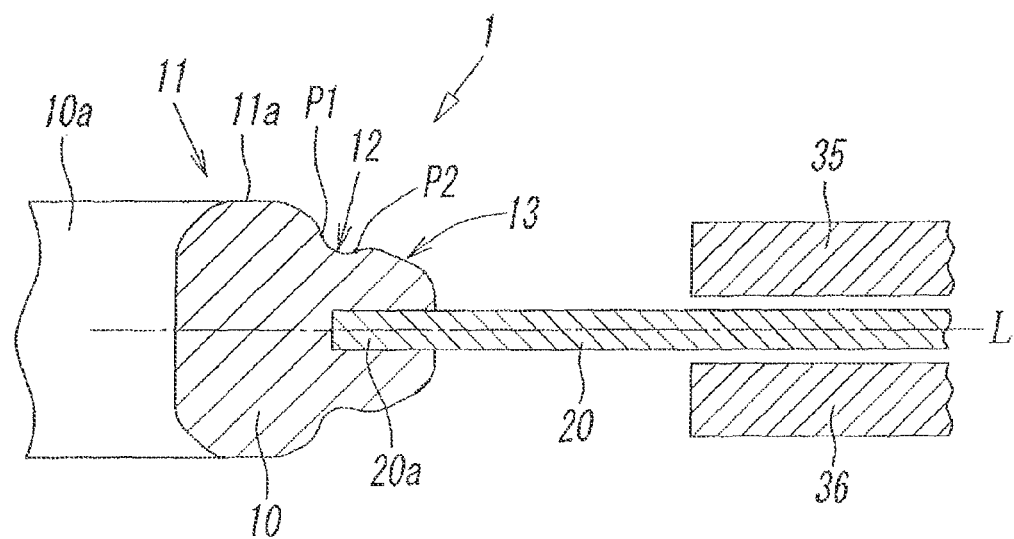
FIG. 2 is an enlarged cross-sectional view taken along an A-A line in FIG. 1, and shows an embodiment of essential parts of an example of the rubber ring for a gasket according to the present invention.

FIG. 1 shows a gasket 30 comprising a rubber ring 1 for a gasket.
according to the present invention, and FIG. 2 shows a structure of essential parts of the rubber ring 1 by an enlarged cross-sectional surface.

The gasket 30 shown in FIG. 1 is installed between a cylinder block and a cylinder head in an internal-combustion engine of an automobile and the like in order to improve a sealing property therebetween. In the gasket 30, there are provided combustion-chamber holes 31 in a position corresponding to a combustion chamber of the cylinder block. Around the combustion-chamber holes 31, there are provided water holes 32 for passing coolant water through, and oil holes 33 for passing oil through. Also, there are provided bolt holes 34 for inserting and passing a bolt which securely fastens the cylinder block and the cylinder head. The gasket 30 includes two sheets of gasket plates 35 and 36 which approximately have the same shape on both upper and lower face sides (see FIG. 2), and the rubber ring 1 placed in the gasket 30 is installed in a portion of the water holes 32 and the oil holes 33 of the gasket. 30.

Incidentally, the rubber ring for a gasket according to the present invention is not limited. to applications to fluid holes of the gasket 30 which is installed between the cylinder head and the cylinder block in the internal-combustion engine of the automobile and the like explained with reference to FIG. 1 and FIG. 2 here.

The rubber ring 1 in FIG. 2 includes an annular sealing rubber 10 and a metal plate 20 including a hole with a shape which fits into the water holes 32, the oil holes 33, or the like in the gasket 30. A planar shape of the sealing rubber 10 is the shape of the hole of the metal plate 20, and specifically, corresponds to a shape of a portion to be sealed such as the water holes 32, the ail holes 33, or the like.

The rubber ring 1 is placed in the gasket by clamping the metal plate 20 between two sheets of gasket plates 35 and 36 in the gasket 30, and it is obvious that the metal plate 20 includes a portion stably clamped by the gasket plates around the hole.

Also, the rubber ring 1 includes a communicating hole 10a in the center of the sealing rubber 10, which is smaller than the holes of the gasket 30 wherein the rubber ring 1 is installed, and has a shape corresponding to the holes of the gasket 30. Then, when the gasket 30 is installed between the cylinder block and the cylinder head, the sealing rubber 10 of the rubber ring 1 is pressed by the cylinder block and the cylinder head. Thereby, the sealing property of the fluid holes of the gasket 30, wherein the rubber ring 1 is installed, is ensured.

As shown in FIG. 2, an example of the rubber ring 1 for a gasket according to the present invention includes the annular sealing rubber 10, and the metal plate 20 including a mounting hole for a sealing rubber, which has a shape of a circle, an oval, or the like, and is mounted on an end face on an outer circumferential side of the sealing rubber 10. The cross-sectional shape of the rubber ring 1 is symmetric with a center line L in a thickness direction. Also, the sealing rubber 10 includes a first bulging portion 11 on an inner circumferential side in the cross-sectional surface; a second bulging portion 13 on the outer circumferential side; and a depressed portion 12 between the first bulging portion 11 and the second bulging portion 13. In a groove provided in the end face on the outer circumferential side of the annular sealing rubber 10, there is embedded a hole edge portion 20a of the metal plate 20, and the hole edge portion 20a of the metal plate 20 is attached to the sealing rubber 10.

The first bulging portion 11 composes a seal portion on the inner circumferential side of the sealing rubber 10, and includes a thickest portion 11a which has a largest thickness and is flat. The thickest portion 11a has a width necessary for ensuring a sealing function. Also, the second bulging portion 13 composes an attachment portion relative to the metal plate 20 on the outer circumferential side of the sealing rubber 10, and a thickness of a top portion of the second bulging portion 13 is smaller than a thickness of the first bulging portion 11.

Also, when the rubber ring 1 is placed on the gasket 30, and is compressed by faces sandwiching the gasket 30 from both face sides thereof, the second bulging portion 13 includes a thickness which does not have contact with the faces sandwiching the gasket 30 together with the depressed portion 12. Moreover, in the depressed portion 12, a smallest thickness is enlarged more than 50% of the thickness of the thickest portion ha in the first bulging portion 11. While a connecting strength between the first bulging portion 11 and the second bulging portion 13 is being held, due to a presence of the depressed portion 12, the depressed portion 12 has a function controlling an effect of a compression force acting on the first bulging portion 11 from affecting a second bulging portion 13 side.

The depressed portion 12 has the function controlling the effect of the compression force acting on the first bulging portion 11 from affecting the second bulging portion 13 side, especially the attachment portion of the sealing rubber 10 and the metal plate 20, so that an end position of the metal plate 20, which is embedded up to a portion reaching an inside of the depressed portion 12 from an inside of the second bulging portion 13 of the sealing rubber 10, is required to be located between an end portion on an inner circumferential side of the depressed portion 12 and an end portion on an outer circumferential side of the depressed portion 12. However, specifically, from the viewpoint of avoiding the effect of the aforementioned compression force from affecting the aforementioned attachment interfacial surface, it is effective for a slope face, which is a portion sinking in the depressed portion 12 from both the bulging portions 11 and 13, and slopes toward the depressed portion 12 from the first bulging portion 11 and the second bulging portion 13, to be positioned between changing points P1 and P2 which. change into a curved surface of a depression outward from a curved surface of a projection outward.

Also, the changing points P1 and P2 can be a sloped portion which is the closest to a face perpendicular to the center line L in the thickness direction of the rubber ring 1 on a surface of the sealing rubber 10 between the bulging portions 11 and 13, and the depressed portion 12. There is a portion wherein a sloped angle does not change between the bulging portions 11 and 13, and the depressed portion 12. In a case wherein the sloped portion, which is the closest to the face perpendicular to the center line L, cannot be identified, it seems unlikely that there is a particular variation in a function effect therebetween, so that the aforementioned changing points P1 and P2 should be considered as the closest point to the bulging portions 11 and 13 among the portion wherein the sloped angle does not change.

Figure 3:
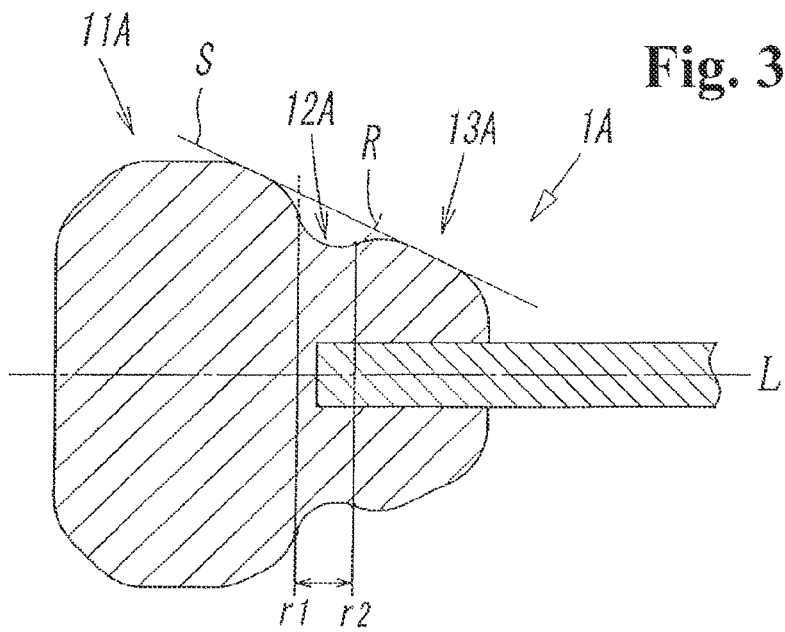
FIG. 3 is an explanatory drawing shown by an enlarged cross-sectional surface for explaining one design method of the rubber ring for a gasket according to the present invention.

Specifically, an embodiment of the rubber ring can be formed in a structure designed in such a way as to be explained hereinafter with reference to FIG. 3. The rubber ring 1 in FIG. 2 is explained simply as the rubber ring 1 including the first bulging portion 11 on the inner circumferential side in the cross-sectional surface of the sealing rubber 10; the second bulging portion 13 on the outer circumferential side; and the depressed portion 12 therebetween. On the other hand, although a rubber ring 1A shown in FIG. 3 does not include an embodiment which substantially differs from the rubber ring 1 in FIG. 2, as a design method of the rubber ring, a first bulging portion 11A and a second bulging portion 13A are formed as including one portion of a straight line S inside a pair of the sloping straight lines S on both sides of the center line L in the thickness direction of the rubber ring 1A in a cross-sectional surface shown in FIG. 3. In other words, one portion of the straight line S has contact with both the bulging portions 11A and 13A, and a depressed portion 12A between both the bulging portions 11A and 13A is formed as having a shape depressing respectively both the straight lines S by a circular arc R vertically toward a center line L side. Also, a corner portion of an intersection point between the straight line S and the circular arc R which occurs by the aforementioned design is chamfered by a small circular arc-like smooth surface.

In that case, as is the case explained by FIG. 2, from the viewpoint of providing the function controlling the effect of the compression force acting on the first bulging portion 11 from affecting the aforementioned attachment interfacial surface, it is appropriate that an end of the metal plate 20, which is embedded in the sealing rubber 10, is positioned within a range of a point r1 and a point r2 of both ends wherein the depressed portion 12A formed by the aforementioned circular arc R is present between both the bulging portions 11A and 13A.

The aforementioned range does not have a substantial difference as long as the corner portion of the intersection point between the straight line S and the circular arc B is not extremely chamfered. compared to the rubber ring 1 explained by FIG. 2. Especially, it is obvious that the depressed portion 12A, formed by the circular arc R between both the bulging portions 11A and 13A, is a curved surface of a depression outward. Therefore, as for the range of the point r1 and the point r2 of both ends wherein the depressed portion 12A, formed by the aforementioned circular arc R, is present, in the rubber ring 1 in FIG. 2, a slope face, sloping toward the depressed portion. 12 from the first bulging portion 11 and the second bulging portion 13, is the same as the changing points P1 and P2 which change into the curved surface of the depression outward from the curved surface of the project 1 on outward, or at least is positioned slightly on an inner side thereof.

By the above-mentioned structure, at a usage time of the gasket 30, only the first bulging portions 11 and 11A of the sealing rubber 10 are largely compressed, so that a dimension of stress occurring in the depressed portions 12 and 12A and the second bulging portions 13 and 13A is controlled, and stress occurring in the attachment interfacial surface of the sealing rubber 10 and the metal plate 20 is reduced.

As for a material of the sealing rubber 10 in the rubber rings 1 and 1A for a gasket, there can be used natural rubber, fluorine-containing rubber, nitrile-butadiene rubber, styrene-butadiene rubber, chloroprene rubber, silicon rubber, or the like as a preferred material. Also, as for en adhesive agent attaching the sealing rubber 10 and the metal plate 20, it is preferable to use a polyurethane, acrylic, epoxy, phenol, nitrile-butadiene rubber, or chloroprene rubber adhesive. Moreover, for the metal plate 20, there can be used stainless steel, iron, or galvanized steel.

Figure 4:
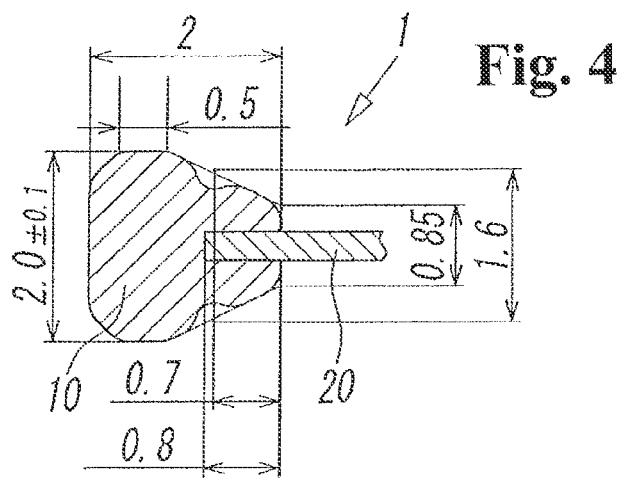
FIG. 4 is a cross-sectional view showing details of an embodiment of one example of the rubber ring for a gasket according to the present invention.

Hereinafter, regarding the rubber ring 1 for a gasket according to the present invention wherein a specific embodiment is formed as shown in FIG. 4 based on the design method explained by FIG. 3, the stress distributions when the rubber ring 1 is compressed by being sandwiched by two faces on both sides will be explained.

Figure 5A:
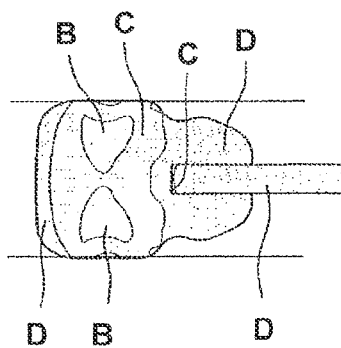
FIGS. 5(a) to 5(c) are stress distribution drawings when the rubber ring for a gasket according to the aforementioned example is compressed respectively by compression rates of 20%, 25%, and 30%.
Figure 5B:
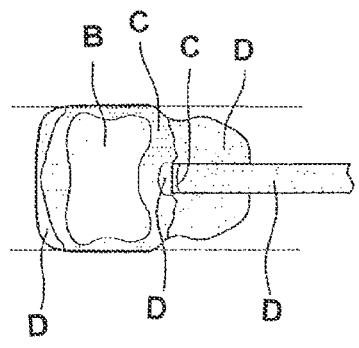
Figure 5C:
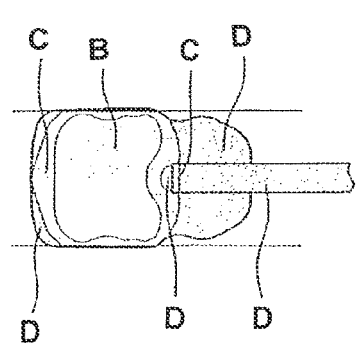
Figure 6:
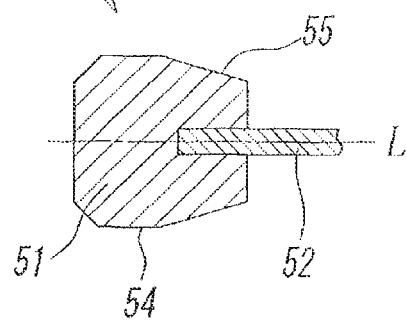
FIG. 6 is a cross-sectional view showing a conventional example of the rubber ring for a gasket.
Figure 7A:
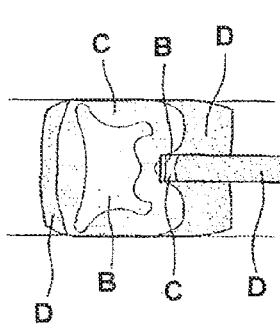
FIGS. 7(a) to (c) are stress distribution drawings when the rubber ring for a gasket shown in FIG. 6 is compressed respectively by compression rates of 20%, 25%, and 30%.
Figure 7B:
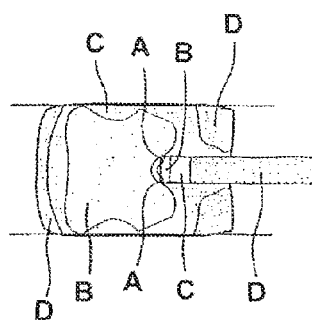
Figure 7C:
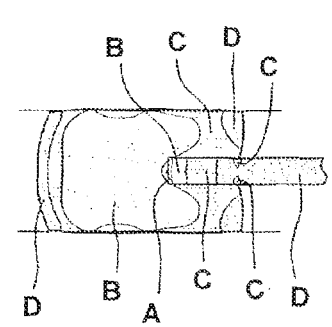
Figure 8:
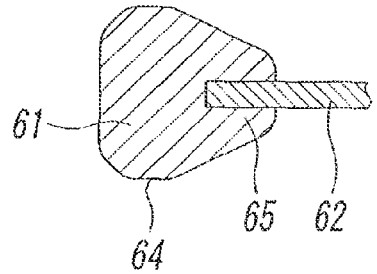
FIG. 8 is a cross-sectional view of essential parts of a rubber ring for a gasket as a reference example contrasting to the present invention.
Figure 9:
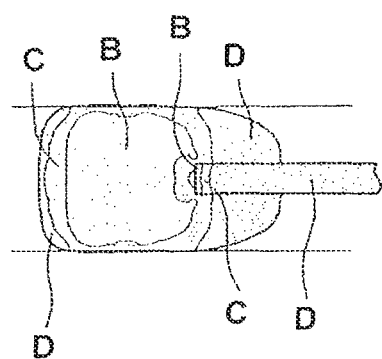
FIG. 9 is a stress distribution drawing when the rubber ring for a gasket of the aforementioned reference example is compressed by a compression rate of 30%.

FIGS. 5(a) to 5(c) show results for stress distributions which occur in the rubber ring 1 for a gasket when the rubber ring 1 for a gasket is sandwiched by the aforementioned two faces, and the sealing rubber 10 is compressed only by 20%, 25%, and 30% in the thickness direction. In FIGS. 5(a) to 5(c), a dimension of stress inside the rubber ring 1 for a gasket is expressed using a contrasting density of dots, and as the density is paler, the stress becomes larger in an order of symbols A, B, C, and D as in the case of FIGS. 7(a) to 7(c).

According to FIGS. 5(a) to 5(c) The aforementioned rubber ring 1 for a gasket is formed so that the depressed portion 12 and the second bulging portion 13 are not compressed even if the rubber ring for a gasket is compressed only by 20% to 30%. Accordingly, an area wherein the stress increases is not spread very largely until an outside of the first bulging portion 11. Also, especially, the attachment interfacial surface between upper and lower faces of the sealing rubber 10 and the metal plate 20 in a range of the second bulging portion 13 is in a state wherein the stress has not substantially acted as in the case inside the metal plate 20. Also, in a range of the depressed portion 12, in any of those cases wherein the rubber ring 1 for a gasket is compressed by 20% to 30% in the thickness direction, only in a vicinity of an end portion of the metal plate 20, the stress only increases for one degree more than the attachment interfacial surface.

Therefore, even in a case wherein the aforementioned gasket is used for a long period of time, there can be controlled a detachment of the sealing rubber 10 from the metal plate 20, or a crack in the sealing rubber 10 in the vicinity of the end portion of the metal plate 20.

The disclosure of Japanese Patent Application No. 2012-057195, filed on Mar. 14, 2012, is incorporated, in the application.

While the invention has been explained with reference to the specific embodiments of the invention, explanation is illustrative and the invention is limited only by the appended claims.

What is claimed is:

1. A combination comprising:
   an internal combustion engine having a cylinder head and a cylinder block, and
   a gasket installed between the cylinder head and the cylinder block, the gasket comprising:
   a metal plate having a hole edge portion, and
   an annular sealing rubber having an outer circumferential side to which the hole edge portion of the metal plate is embedded, the annular sealing rubber having a cross-sectional shape symmetric to a center line in a thickness direction of the annular sealing rubber,
   wherein the annular sealing rubber comprises:
   a first bulging portion comprising a seal portion on an inner circumferential side of the sealing rubber, bulging in a direction perpendicular to the center line;
   a second bulging portion comprising an attachment portion relative to the metal plate on the outer circumferential side of the sealing rubber, bulging in the direction perpendicular to the center line; and
   a depressed portion between the first bulging portion and the second bulging portion, depressed in the direction perpendicular to the center line,
   wherein the first bulging portion includes a thickest portion carrying out a sealing function, and when the gasket is compressed by faces of the cylinder head and the cylinder block sandwiching the gasket from opposite sides, the second bulging portion and the depressed portion have a thickness which does not contact with the faces sandwiching the gasket,
   an end of the metal plate embedded in the sealing rubber is positioned in a range of the depressed portion between the first bulging portion and the second bulging portion, and between changing points where a sloping face sloping toward the depressed portion from each of the two bulging portions changes from a concave curved surface into a convex curved surface,
   the first bulging portion and the second bulging portion in the annular sealing rubber are formed as each including a flat portion on both sides of the center line in the thickness direction of the annular sealing rubber, the flat portion of the first bulging portion and the flat portion of the second bulging portion being portions of a single straight sloped line on each side of the center line, and the depressed portion is formed between the two bulging portions as having a shape depressing respectively both of the straight sloped lines into a circular arc directed toward the center line portions, the end of the metal plate embedded in the annular sealing rubber is positioned within a range wherein the depressed portion forming the circular arc is formed, and at least thickness of the annular sealing rubber in the depressed portion is greater than 50% of a thickness of the thickest portion in the first bulging portion, and is less than a thickness of atop portion of the second bulging portion.

2. The combination according to claim 1, wherein a material of the sealing rubber is natural rubber, fluorine-containing rubber, nitrile-butadiene rubber, styrene-butadiene rubber, chloroprene rubber, or silicon rubber.

3. The combination according to claim 1, wherein an adhesive agent attaching the sealing rubber and the metal plate is a polyurethane, acrylic, epoxy, phenol, nitrile-butadiene rubber, or chloroprene rubber adhesive.

4. The combination according to claim 1, wherein the metal plate is stainless steel, iron, or galvanized steel.

* * * * *